(12) United States Patent
Kahn (10) Patent No.: US 9,807,548 B2
(45) Date of Patent: Oct. 31, 2017

(54) METHOD AND SYSTEM FOR OBTAINING LOCATION INFORMATION FROM A WIRELESS NETWORK

(71) Applicant: Colin Kahn, Murray Hill, NJ (US)

(72) Inventor: Colin Kahn, Murray Hill, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 281 days.

(21) Appl. No.: 13/757,470

(22) Filed: Feb. 1, 2013

(65) Prior Publication Data
US 2014/0221002 A1 Aug. 7, 2014

(51) Int. Cl.
| | |
|---|---|
| *H04W 4/02* | (2009.01) |
| *H04W 64/00* | (2009.01) |
| *H04W 12/08* | (2009.01) |
| *H04W 8/10* | (2009.01) |
| *H04W 8/16* | (2009.01) |

(52) U.S. Cl.
CPC ............. *H04W 4/02* (2013.01); *H04W 4/021* (2013.01); *H04W 8/10* (2013.01); *H04W 12/08* (2013.01); *H04W 8/16* (2013.01); *H04W 64/00* (2013.01)

(58) Field of Classification Search
CPC .. G08B 25/016; G08B 21/0205; G08B 25/00; G08B 7/062; H04L 67/18; H04L 12/5865; H04L 51/20; H04L 67/22; H04W 36/32; H04W 64/00; H04W 8/16; H04W 4/02; H04W 4/028; H04W 4/021; H04W 4/023; H04W 4/04; H04W 8/10; H04M 1/72572; G06Q 30/0261; G06Q 30/0269; G06Q 30/0207; G06Q 30/0241; G06Q 30/0251; G06Q 30/0281; G06Q 30/0201; G06Q 30/0271; G06Q 20/18; G06Q 30/00; G06Q 30/0212; G06Q 30/0224; G06Q 30/0242; G06Q 30/0247; G06Q 30/0258; G06Q 30/0259; G06Q 30/0282; G06Q 30/0641; G06Q 30/08; G06Q 40/04; H04N 21/812; H04H 60/33
See application file for complete search history.

(56) References Cited

U.S. PATENT DOCUMENTS

| | | |
|---|---|---|
| 2006/0105788 A1 | 5/2006 | Duan |
| 2006/0206610 A1* | 9/2006 | Ling et al. ............... 709/226 |

(Continued)

FOREIGN PATENT DOCUMENTS

JP 2012100303 A 5/2012

OTHER PUBLICATIONS

Jun. 12, 2014 Notification of Transmittal of the International Search Report and the Written Opinion of the International Searching Authority, or the Declaration in PCT/US2014/011952, Alcatel Lucent, Applicant, 9 pages.

*Primary Examiner* — Nizar Sivji
(74) *Attorney, Agent, or Firm* — Tong, Rea, Bentley & Kim, LLC (57) ABSTRACT

Systems, methods, apparatus and mechanisms for deriving user device location information by exploiting existing voice and/or data capabilities within the Radio Access Network (RAN) layer of a 4G or 3G wireless network, and offering the derived user device location information to network optimization functions, application and/or service providers via an application programming interface (API).

20 Claims, 4 Drawing Sheets

(56) References Cited

U.S. PATENT DOCUMENTS

| | | | |
|---|---|---|---|
| 2009/0307091 A1* | 12/2009 | Lilley | G06Q 30/02 705/14.58 |
| 2010/0070360 A1* | 3/2010 | Gilbert et al. | 705/14.19 |
| 2010/0093380 A1 | 4/2010 | Gustafsson | |
| 2010/0151821 A1* | 6/2010 | Sweeney | H04W 4/02 455/410 |
| 2010/0323716 A1* | 12/2010 | Jaffri | G06Q 30/02 455/456.1 |
| 2012/0214519 A1* | 8/2012 | Okabe | H04W 76/028 455/458 |
| 2012/0276928 A1* | 11/2012 | Shutter | G06Q 30/02 455/456.3 |
| 2013/0045758 A1* | 2/2013 | Khorashadi | H04W 4/001 455/456.3 |
| 2013/0085861 A1* | 4/2013 | Dunlap | G01S 19/34 705/14.58 |
| 2013/0103500 A1* | 4/2013 | Veeneman | G06Q 30/02 705/14.57 |
| 2014/0120944 A1* | 5/2014 | Tarkkala | H04W 4/027 455/456.1 |
| 2015/0012332 A1* | 1/2015 | Papachristos | H04L 67/125 705/7.29 |
| 2015/0365789 A1* | 12/2015 | Salot | H04W 4/02 455/456.1 |

\* cited by examiner

METHOD AND SYSTEM FOR OBTAINING LOCATION INFORMATION FROM A WIRELESS NETWORK

FIELD OF THE INVENTION

The invention relates generally to wireless communication networks, and more particularly to video transmission over an air interface in such networks.

BACKGROUND

Wireless access networks such as 3G, 4G, Long Term Evolution (LTE) networks and the like contemplate multiple zones or areas through which mobile devices and other user equipment (UE) move. Various mechanisms are known to determine when wireless (3G/4G) subscribers have entered zones associated with specific services, such as sports stadiums, shopping malls, trade shows and the like.

Generally speaking, these mechanisms adapt the operation of the UEs, base stations, eNodeBs and the like to provide additional messaging indicative of UE locations. Unfortunately, these mechanisms result in a significant increase in location related messages such that enormous equipment expenditures are required to support location-based services.

For example, 3GPP has standardized an architecture (3GPP 23.271) and corresponding E-UTRAN capabilities (3GPP TS 36.305) to support Location Services (LCS). In that architecture clients may request UE location information by sending requests to a LCS Server. The LCS Server may include a Home and Visited Gateway Mobile Location Server (GMLC), and an Evolved Serving MLC (E-SMLC) depending on the deployment architecture. The LCS server may use a variety of techniques to obtain the UE location information and formulate a response to the requesting client. They include using UE received Global Navigation Satellite Systems (GNSS) information (such as provided by GPS, Galileo and GLONASS), using Network Assisted GPS, using Cell ID and Enhanced Cell ID, and/or using Downlink and/or Uplink Observed Time Difference of Arrival (OTDOA).

In a typical scenario, the 3GPP specification requires that obtained location information be delivered from the UE and/or eNB to the E-SMLC/GMLC and forwarded to the requesting client via the core network control plane. In summary, for an LTE network, the GMLC receives the request for location information from the network client, and performs client authorization and privacy checks. The GMLC sends the location request, via the MME, to the E-SMLC. The E-SMLC interacts with the UE and/or eNB to obtain location information. The response is then returned to the GMLC via the MME. The GMLCS then sends a response to the requesting network client.

An alternative method for reporting of location information is provided by Open Mobile Alliance, OMA AD SUPL: "Secure User Plane Location Architecture" standards. Here user plane bearers are used for transferring location related messages between a required UE SUPL client and a network server.

All of these solutions suffer from various problems that make them poor choices to serve requests from thousands of mobile devices in crowded environments.

SUMMARY

Various deficiencies in the prior art are addressed by systems, methods, apparatus and mechanisms for deriving user device location information by exploiting existing voice and/or data capabilities within the Radio Access Network (RAN) layer of a 4G or 3G wireless network, and offering the derived user device location information to network optimization functions, application and/or service providers via an application programming interface (API).

A method according to one embodiment comprises: receiving an access network mobility management area update signal indicative of user equipment (UE) crossing an area boundary; determining if the UE is located within an area associated with an authorized application or network optimization function; and providing UE location information to any application or network optimization function authorized for the UE area.

BRIEF DESCRIPTION OF THE DRAWING

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Embodiments of the invention will be primarily described within the context of various mechanisms adapted to derive user device location information by exploiting existing voice and/or data capabilities within the Radio Access Network (RAN) layer of a 4G (e.g., Long Term Evolution (LTE)) or 3G wireless networks. The derived user device location information may be offered via an application programming interface (API) or other mechanism to providers of applications and/or network service optimizations.

While primarily discussed within the context of offering area-specific applications and/or network service optimizations within the context of LTE or 3G wireless networks, those skilled in the art and informed by the teachings herein will realize that the various embodiments are also applicable to location information offerings associated with other types of wireless networks, such as 2G networks, WiMAX, 802.11x and the like. Thus, the network elements, links, connectors, sites and other objects representing mobile services may identify network elements associated with other types of wireless and wireline networks. Moreover, various embodiments contemplate the use of combinations of various types of wireless networks.

Generally speaking, the various embodiments provide a massively scalable mechanism to determine when subscribers in a LTE or 3G wireless network have entered zones associated with specific services. Unlike existing mechanisms, the mechanisms of the various embodiments achieve this without impact to the user equipment (UE) or the base stations (BSs) and/or eNodeBs supporting the UE, and without requiring new messages within the LTE or 3G core network. The various embodiments are adapted to enable venue specific services in crowded venues or environments such as sports stadiums, shopping malls, trade shows, airports, defined geographic areas and the like.

Various embodiments operate to inform a venue experience portal, application server or other entity that a subscriber has entered a particular venue such that venue-specific applications and/or network/service optimizations may be offered to the subscriber.

Figure 1:
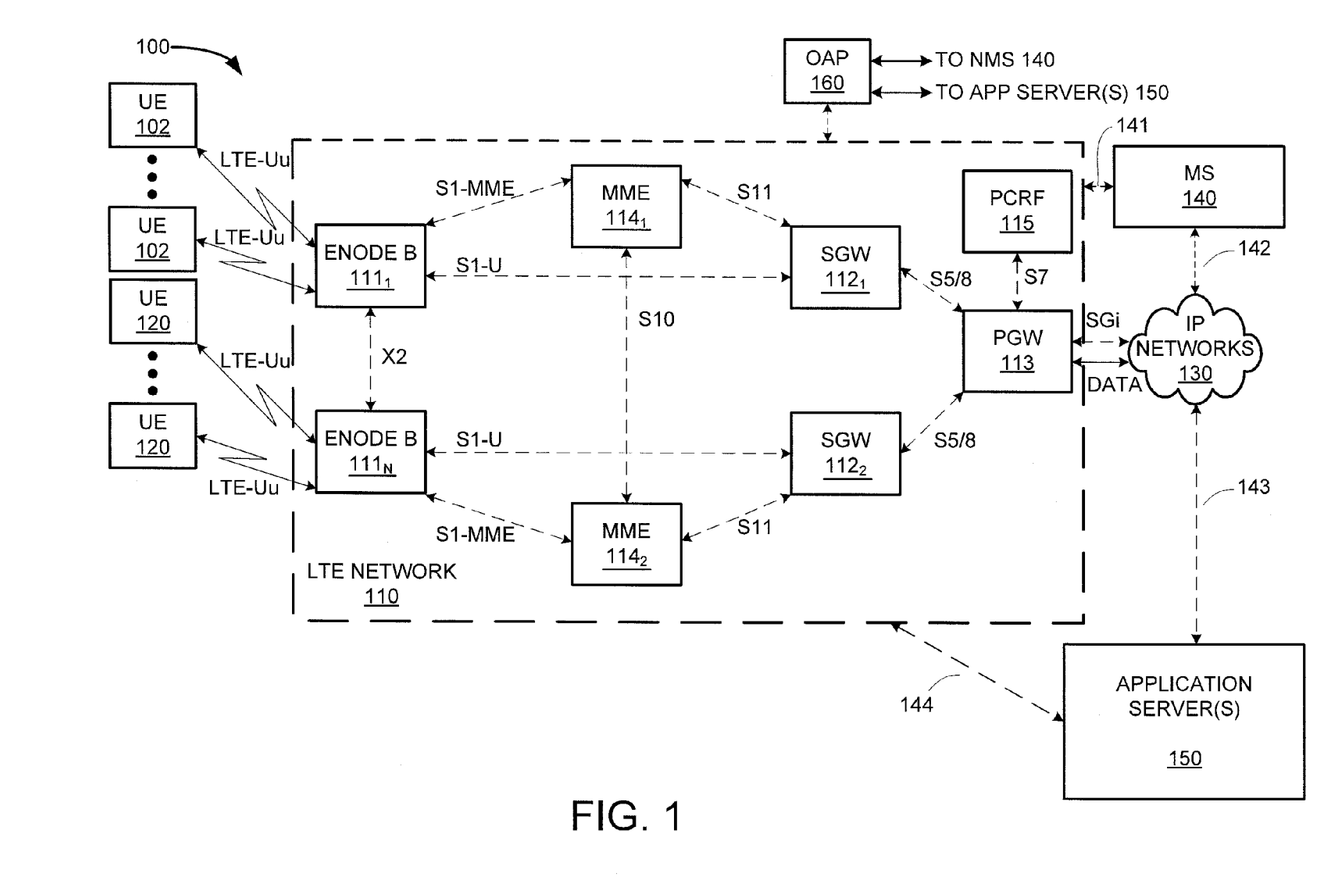
FIG. 1 depicts an exemplary wireless communication system benefiting from various embodiments.

FIG. 1 depicts an exemplary wireless communication system benefiting from various embodiments. Specifically, FIG. 1 depicts an exemplary wireless communication system 100 that includes a plurality of User Devices (UDs) or User Equipment (UE) 102/120, a Long Term Evolution (LTE) network 110, IP networks 130, a management system (MS) 140, one or more application servers 150 and a network element adapted to offer UE location information, illustratively an Open Application Programming Interface (API) Platform (OAP) 160.

The LTE network 110 supports communications between the UDs 102/120 and IP networks 130. The MS 140 is configured for supporting various management functions for LTE network 110.

The UDs 102/120 are wireless user devices capable of accessing a wireless network, such as LTE network 110. UDs 102/120 are capable of supporting control signaling in support of bearer session(s). UDs 102/120 may comprise a phone, tablet, computer, or any other wireless user device.

The general configuration and operation of a network such as LTE network 110 will be understood by one skilled in the art. The exemplary LTE network 110 includes a plurality of eNodeBs $111_1$ through $111_N$ (collectively, eNodeBs 111), one or more Serving Gateways (SGWs) 112, at least one Packet Data Network (PDN) Gateway (PGW) 113, one or more Mobility Management Entities (MMEs) 114, and at least one Policy and Charging Rules Function (PCRF) 115. Various modifications to this configuration are known to those skilled in the art and are contemplated by the inventor as applicable to the various embodiments.

The eNodeBs 111, SGWs 112, PGW 113, MMEs 114, PCRF 115, as well as various LTE network components which have been omitted for purposes of clarity, cooperate to provide an Evolved Packet Core (EPC) network supporting end-to-end service delivery using IP. Other architectures and variations thereof are also contemplated by the inventor as supporting the embodiments.

The eNodeBs 111 provide radio access interface functions for the respective groups of UDs 102/120. As depicted in FIG. 1, each eNodeB 111 is associated with a base station scheduler SCH and supports a respective plurality of UDs 102/120. The communication between the eNodeBs 111 and the UEs 102/120 is supported using LTE-Uu interfaces associated with each of the UDs 102/120.

The SGWs 112 support communications for various pluralities of eNodeBs 111 using S1-u interfaces. The S1-u interfaces support per-bearer user plane tunneling and inter-eNodeB path switching during handover. It will be appreciated that the SGWs 112 may support more or fewer eNodeBs then indicated.

The PGW 113 supports communications for the SGWs 112 using respective S5/S8 interfaces. The S5 interfaces provide functions such as user plane tunneling and tunnel management for communications between PGW 113 and SGWs 112, SGW relocation due to UE mobility, and the like. The S8 interfaces, which may be Public Land Mobile Network (PLMN) variants of the S5 interfaces, provide inter-PLMN interfaces providing user and control plane connectivity between the SGW in the Visitor PLMN (VPLMN) and the PGW in the Home PLMN (HPLMN). The PGW 113 facilitates communications between LTE network 110 and IP networks 130 via, illustratively, an SGi interface.

The MMEs 114 provide mobility management functions in support of mobility of UDs 102/120. The MMEs 114 support the eNodeBs 111 using S1-MME interfaces, which provide control plane protocols for communication between the MMEs 114 and the eNodeBs 111.

The PCRF 115 provides dynamic allocation capabilities by which the service provider may manage rules related to services provided via LTE network 110 and rules related to charging for services provided via LTE network 110.

As depicted in FIG. 1, elements of LTE network 110 communicate via interfaces between the elements. The interfaces described with respect to LTE network 110 also may be referred to as sessions.

The LTE network 110 includes an Evolved Packet System/Solution (EPS). In one embodiment, the EPS includes EPS nodes (e.g., eNodeBs 111, SGWs 112, PGW 113, MMEs 114, and PCRF 115) and EPS-related interconnectivity (e.g., the S* interfaces, the G* interfaces, and the like). The EPS-related interfaces may be referred to herein as EPS-related paths.

The IP networks 130 include one or more packet data networks via which UDs 102/120 may access content, services, and the like.

The MS 140 provides management functions for managing the LTE network 110. The MS 140 may communicate with LTE network 110 in any suitable manner. In one embodiment, for example, MS 140 may communicate with LTE network 110 via a communication path 141 which does not traverse IP networks 130. In one embodiment, for example, MS 140 may communicate with LTE network 110 via a communication path 142 which is supported by IP networks 130. The communication paths 141 and 142 may be implemented using any suitable communications capabilities. An exemplary management system suitable for use as MS 140 of FIG. 1 is depicted and described with respect to FIG. 5.

Generally speaking, the MS 140 is adapted to manage the above-described network elements including the UEs 102, eNodeBs 111, Serving Gateways (SGWs) 112, Packet Data Network (PDN) Gateway (PGW) 113, Mobility Management Entities (MMEs) 114, and Policy and Charging Rules Function (PCRF) 115, as well as various other network elements (not shown) as well as the various communication links therebetween.

The wireless communication system 100 described above with respect to FIG. 1 comprises, illustratively, a 4G wireless network implemented according to the various LTE protocols. In these embodiments, the MME receives information from the various eNodeBs which may be used to derive subscriber or UE location.

In other embodiments, the wireless communication system 100 comprises, illustratively, a 3G wireless network incremented according to the various 3GPP protocols. In these embodiments, a General Packet Radio Service (GPRS) protocol is supported by a Serving GPRS Support Node (SGSN) which receives information from various base stations which may be used to derive UE location.

Generally speaking, various embodiments provide a system, mechanism, method and/or apparatus to associate subscriber or user IDs (e.g., MSISDN, IMSI, IP address, etc.) with a subscriber's UE location in an LTE or 3G wireless network for use by applications, service delivery optimization and network optimization functions.

Various embodiments provide notifications when the user enters a zone designated by the wireless operator. Zones may be designated by an operator using 3GPP Tracking Areas (TAs) for 4G/LTE, Routing areas (RAs) for 3G/UMTS data, and Location Areas (LAs) for 3G voice services. These zones are normally setup by mobile network operators to divide geographic areas so that UEs may be found when application data needs to be delivered to the UE. Within the context of the various embodiments, TAs/RAs/LAs may also define zones typically associated with venues.

Various embodiments operate to provide applications, service delivery optimization and/or network optimization functions to subscribers or UEs located within zones so authorized. For example, within designated zones, higher resolution may be provided by tracking handoffs of UEs in the connected state. In various embodiments, both the zone (TA, RA, LA) and/or handoff information within a zone may be exposed via APIs from the MME/SGSN/MSC or similar network element. The various embodiments advantageously utilize existing signaling in the LTE and 3G networks which report handoff and TA/RA/LA updates to the MME/SGSN/MSC. As such, these embodiments are 3GPP (or LTE) standards compliant without requiring new messages or a UE client.

Unlike existing mechanisms, the manner in which this is done is light-weight and hence massively scalable, able to support "check-in" notifications when large numbers of users enter large venues like stadiums and shopping malls.

Various embodiments provide for the implementation of the OAP 160 and application servers 150. For example, in one embodiment, one or both of the OAP 160 and application servers 150 are implemented as standalone devices. In another embodiment, one or both of the OAP 160 and application servers 150 are implemented as part of the management system 140 (e.g., implemented within or directly controlled by MS 140).

Figure 2:
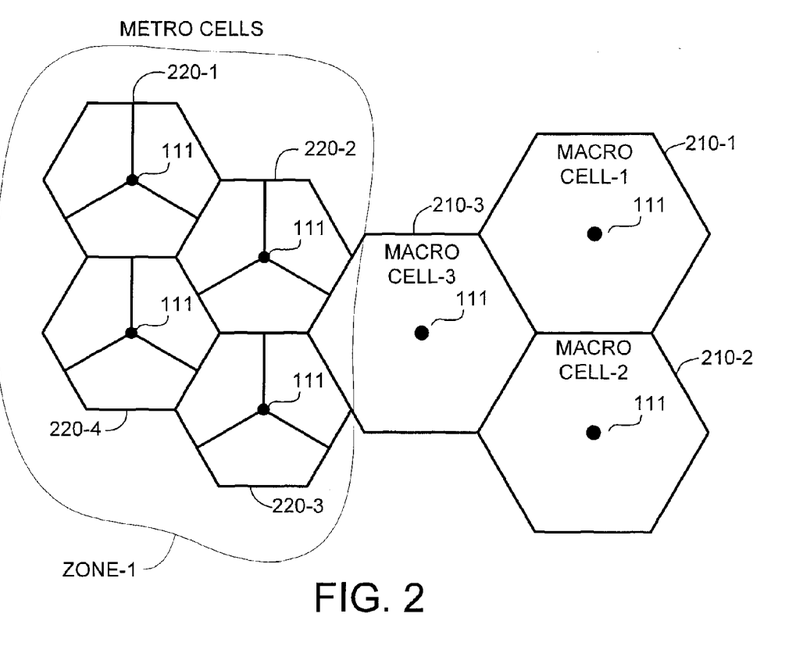
FIG. 2 depicts a graphical representation of wireless network areas useful in understanding the present embodiments.

FIG. 2 depicts a graphical representation of wireless network areas useful in understanding the present embodiments. Specifically, FIG. 2 depicts a plurality of macro cells 210-1 through 210-3 (collectively macro cells 210) and a plurality of metro cells 220-1 to 220-4 (collectively metro cells 220).

The metro cells 220 are deemed to be part of a first geographic area, venue or zone denoted as Zone-1. This geographic area, venue or zone may comprise a stadium, shopping mall, racetrack, concert hall, trade show or any other venue.

Each macro cell 210 or metro cell 220 includes a respective eNodeB 111 (4G) or base station (3G) to support radio traffic with mobile devices located therein. As mobile devices move between boundaries of macro cells 210, metro cells 220 or delineated sub portions thereof, standard messages such as tracking and location updates, handoffs and the like are transmitted from the UEs to corresponding eNodeBs 111 (or base stations) to the MME 114 (or SGSN). It is noted that the communication from the UE to the eNodeBs 111 to the MME 114 (or SGSN) are part of the normal wireless network mobility management procedures and therefore require no UE client and impose no additional communication overhead on the UE, eNodeBs or MME.

Figure 3:
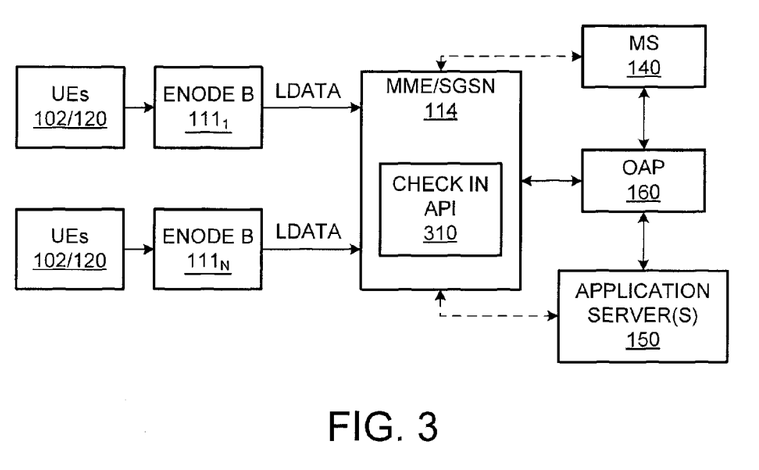
FIG. 3 depicts a simplified view of a portion of the wireless communication system of FIG. 1.

FIG. 3 depicts a simplified view of a portion of the wireless communication system of FIG. 1. Specifically, FIG. 3 depicts a plurality of UEs 102/120 and eNodeBs 111 (or base stations) transmitting location data LDATA to an MME 114 (or SGSN). The location data LDATA is associated with user devices moving between boundaries of macro cells 210, metro cells 220 or delineated sub portions thereof.

The MME 114 (or SGSN) may forward the location data LDATA to the OAP 160 for subsequent propagation to one or both of the MS 140 and application servers 150. In various embodiments, the location data LDATA is forwarded directly to one or both of the MS 140 and application server 150. In still other embodiments, the MME 114 (or SGSN) includes a check-in API 310 operative to forward the location data LDATA to OAP 160, MS 140 and/or application servers 150.

It will be appreciated that the various embodiments described herein are adapted for use in different types of mobile/wireless networks, such as 4G networks conforming to the LTE protocols, 3G networks conforming to the 3GPP protocols and so on.

Referring to FIGS. 2-3, assume that the geographic area, venue or zone denoted as Zone-1 comprises LTE Tracking Area (TA) and/or a 3G/UMTS Routing Area (RA) as defined by a mobile operator. The Zone-1 area encircles a venue such as a stadium or shopping mall where, for example, a venue specific experience is to be offered using applications and network optimization techniques targeted for use in the venue.

When a UE on an LTE network crosses a TA boundary, the UE, following 3GPP defined procedures, sends a Tracking Area Update (TAU) Request to the eNB, which forwards the message to the MME.

Similarly when a UE on a 3G UMTS network crosses a RA boundary, the UE, following 3GPP defined procedures, sends a Routing Area Update (RAU) request to the base station, which forwards the message to the SGSN (via the RNC).

The MME or SGSN record the information within these messages such that they aware of when a UE enters or leaves the venue. Following 3GPP protocols, the MME or SGSN under some circumstances will inform the HSS of the location change, but otherwise do not further expose location for use by applications and network optimization functions.

In various embodiments, when TAU requests or RAU requests occur, the MME and SGSN expose them via, illustratively, an Open API Platform. The OAP provides security to ensure that only authorized applications and optimization functions can access the UE location information. It may also provide API formatting and composition functions, for example translating a proprietary stream of UE identity and location information provided by the MME/SGSN into a Representational State Transfer (REST) API for ease of use.

In various embodiments, when the UE crosses the RA/TA boundary entering the venue, the location API may be used by an operator controlled server to entice subscribers to sign up for a venue-specific experience. For example, assuming a football stadium and its parking lot are defined as an authorized area, or zone associated with authorized applications or network/server optimization functions, all subscribers entering a stadium parking lot may receive a solicitation or "welcome" message via their mobile device. Thus, the location information is used to trigger subscriber solicitations for applications, improved network services and the like as discussed herein.

The welcome message may include an invitation to join the venue-specific experience with gaming, video, special offers and/or interactive applications. The welcome message may also offer a seat upgrade, snack or other service or item in exchange for the subscriber signing up for the application.

A subscriber wishing to sign up for the application will be directed to a transaction portal or website.

The welcome message may include an invitation by the mobile operator to access a venue specific portal/application store where content associated the venue/event is exclusively available.

The welcome message may include an invitation by the mobile operator to access applications or other mobile services at an enhanced quality of service (QoS) level.

In particular, a solicitation to initiate a session associated with an authorized application or network optimization function may be initiated in response to location information indicative of a subscriber entering an area, and a termination of the session may be initiated in response to location information indicative of the subscriber exiting the area.

Various embodiments provide further granularity or accuracy with respect to a subscriber's position within an authorized area or zone. That is, additional location information useful in identifying sub-zone or sub-area subscriber locations may also be made available. Such additional location information may be provided by establishing additional TA/RA boundaries, by exposing handoffs between cells/eNBs within the venue and the like. These additional location mechanisms also exploit existing capabilities within the access network as the MME/SGSN is made aware of the UE location (cell/eNB) as specified by 3GPP protocols.

Various embodiments provide further granularity or accuracy with respect to a subscriber's position within an authorized area or zone by using client location data such as GPS data, wireless network location data and so on.

Sub-zone, sub-venue, sub-area or other improved subscriber location mechanisms may provide location data to be exposed in real-time via an API interface, and may be used by applications and network optimization functions to provide further location specific services. For example, when the subscriber is being served by a cell in the vicinity of the food court, the subscriber may be provided with special offers for food items, whereas subscribers served by a cell covering the stands may not receive this offer.

Various embodiments contemplate a number of network/service delivery or optimization functions, which are used by the network operator to, illustratively, support a venue-specific subscriber experience. These network/service optimization functions may be triggered via the API or some other mechanism.

Figure 4:
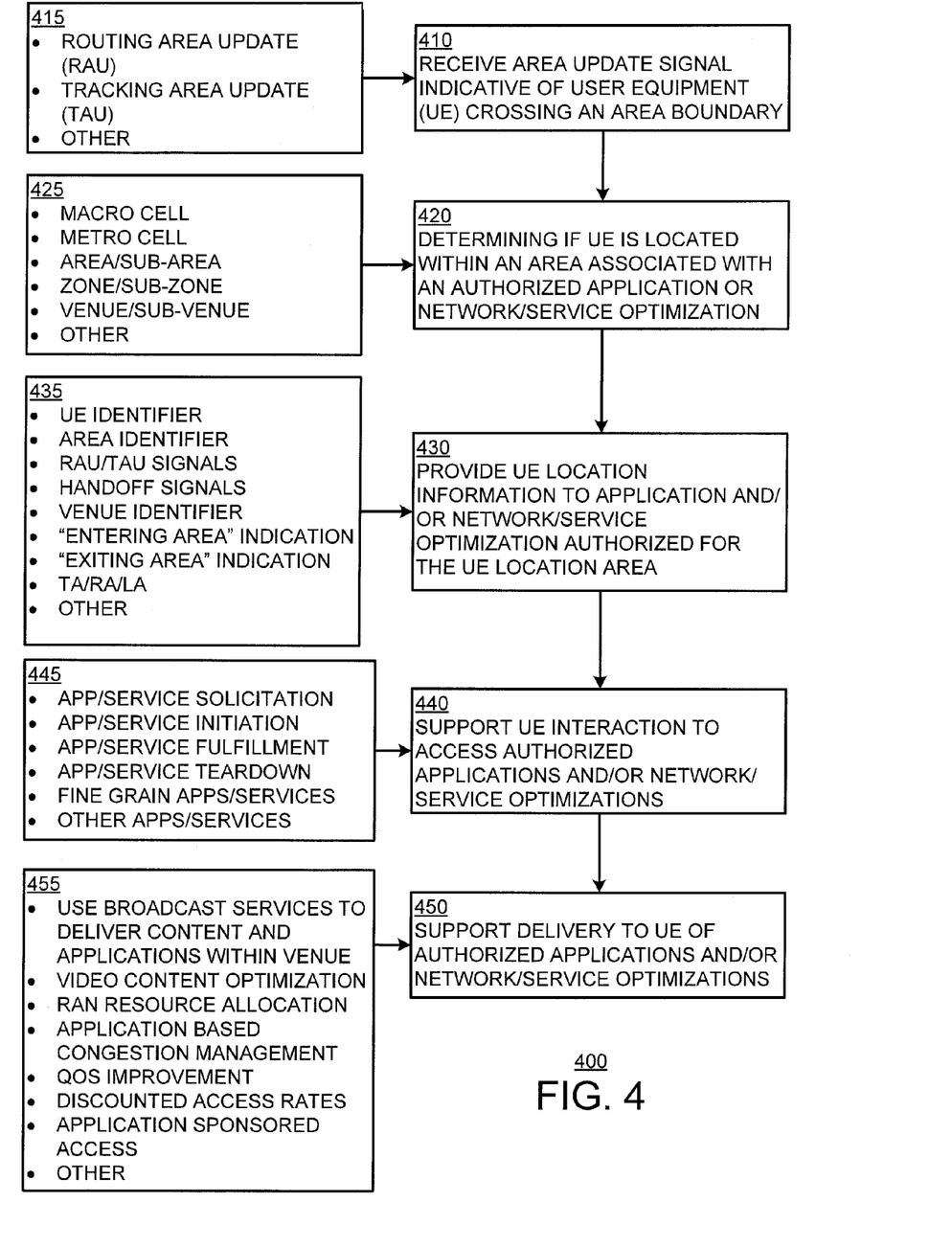
FIG. 4 depicts a flow diagram of a method according to one embodiment.

FIG. 4 depicts a flow diagram of a method according to one embodiment. Specifically, the method 400 of FIG. 4 is adapted to propagate standard 3G/4G signaling related to UE location from an MME within a 4G/LTE network or a SGSN within a 3GPP network via an API to enable, illustratively, venue-specific applications or network/service optimizations.

At step 410, an area update signal indicative of a subscriber's user device (UD) or user equipment (UE) crossing an area or sub-area boundary is received by a MME or SGSN. Referring to box 415, the area update signal may comprise an access network mobility management update signal such as a routing area update (RAU) message indicative of the UE crossing a boundary associated with a 3G/UMTS Routing Area, a tracking area update (TAU) message indicative of the UE crossing a boundary associated with a LTE Tracking Area, or some other location related signal.

At step 420, a determination is made if the UE is located within an area associated with an authorized application or network/service optimization function. Referring to box 425, the area may comprise a macro cell or portion thereof, metro cell or portion thereof, area or sub-area, zone or sub-zone, venue or sub-venue, tracking area, routing area, location area or other defined or delineated area.

At step 430, the UE location information is provided to one or more applications and/or network/service optimization functions authorized for the UE location area. Referring to box 435, the UE location information may comprise some or all of a UE identifier, area identifier, RAU/TAU message, handoffs signal, venue identifier, "entering area" indication, "exiting area" indication or some other system or client derived location information. For example, location information indicative of a subscriber entering an area may be used to trigger subscriber solicitations for applications, improved network services and the like as discussed herein, which may be provided in a session-based manner to the subscriber. Similarly, location information indicative of a subscriber exiting an area may be used to trigger a cessation of any sessions created for the subscriber. These sessions may be created and torn down in response to derived subscriber location information or specific area enter/exit location information.

At step 440, UE interaction to access authorized applications and/or network/service optimizations is supported. Referring to box 445, such support may be provided by enabling some or all of application/service solicitation of the UE, application/service session initiation, session fulfillment and session teardown, fine granularity or sub-venue applications or network/service optimizations, as well as other applications and network/service optimizations.

At step 450, delivery to the UE of authorized applications and/or network/service optimizations is supported. Referring to box 455, various applications or network/service optimization functions may include, illustratively: (1) The use of broadcast service (e.g., LTE eMBMS) to deliver content and applications within the venue; (2) Video content optimization (e.g., improved compression/transcoding); (3) RAN resource allocation (e.g., dedicated bearer assignment); (4) application based congestion management (e.g., in congested environments, applications switch to a low bandwidth mode); (5) QoS improvement such as via setup of dedicated bearers in the 3GPP network; (6) discounted access rates; and (7) application sponsored access. Other network or service optimization functions may also be provided.

Figure 5:
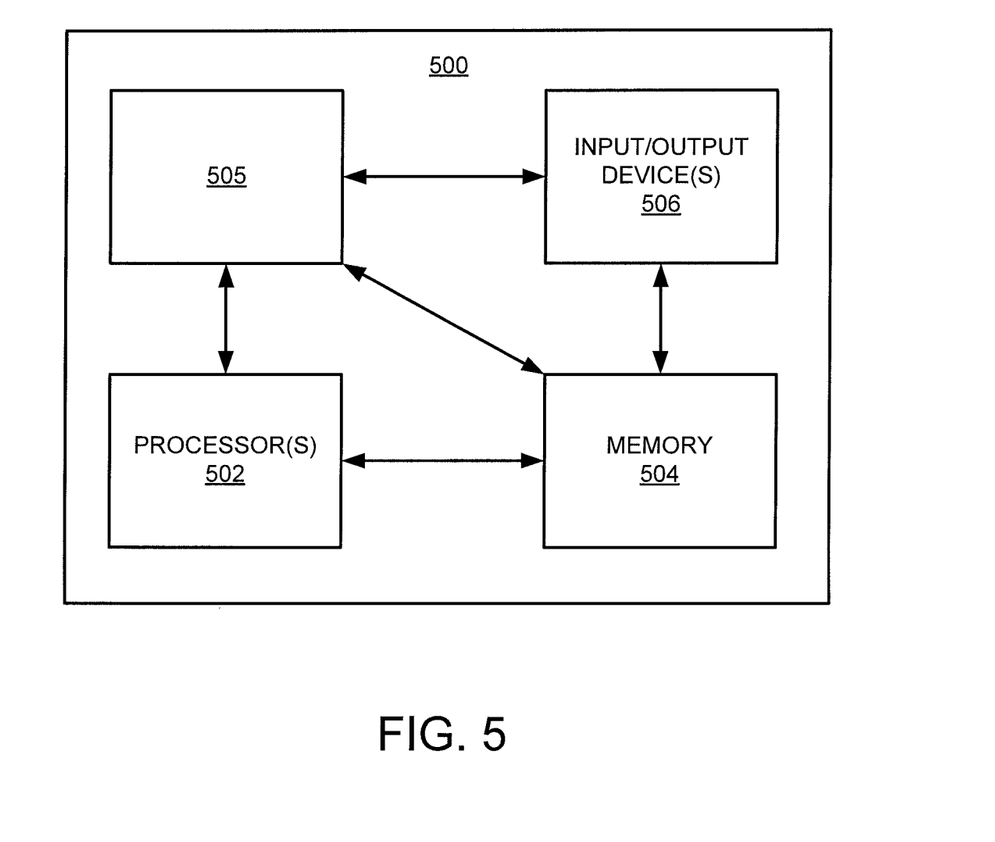
FIG. 5 depicts a high-level block diagram of a computer suitable for use in performing the functions described herein.

FIG. 5 depicts a high-level block diagram of a computer suitable for use in performing functions such as described above with respect to UDs 102/120, eNodeBs or base stations 111, MMEs or SGSNs 114, SGWs 112, PGW 113, PCRF 115, MS 140, application servers 150, OAP 160 and/or various other network elements.

As depicted in FIG. 5, computer 500 includes a processor element 502 (e.g., a central processing unit (CPU) and/or other suitable processor(s)), a memory 504 (e.g., random access memory (RAM), read only memory (ROM), and the like), a cooperating module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that computer 500 depicted in FIG. 5 provides a general architecture and functionality suitable for implementing functional elements described herein or portions of a network implementing the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable media such as fixed or removable media or memory, and/or stored within a memory within a computing device operating according to the instructions.

As previously discussed, the various embodiments provide a mechanism wherein venue-specific applications and/or network/service optimizations may be offered to subscribers in a manner that avoids impacting the user equipment (UE) or the base stations (BSs) and/or eNodeBs supporting the UE, and without requiring new messages within the LTE or 3G core network.

All of these solutions suffer from various problems that make them poor choices to serve thousands of mobile devices in crowded environments. These various problems may include some or all of the following: (1) location reporting is triggered individually for UEs on a request/response basis with the GMLC, which makes the solution not scalable to the extent needed for crowded locations where all subscribers are to be offered venue/location specific services; (2) Control-Plane reporting of location as specified by 3GPP which significantly impacts network signaling capacity; (3) requirement for new network elements (GMLCS, E-SMLC, etc.), with associated cost and interface integration, in most cases between equipment from multiple vendors; (4) Uplink and Downlink OTDOA location determination and OMA AD SUPL, which requires UE clients; (5) location reporting techniques (except Cell ID reporting when the UE is active) impact air-interface capacity; (5) Global Navigation Satellite Systems such as GPS do not work in indoor venues like shopping malls and some stadiums; and (6) Current Cell ID based methods assume that the UEs in idle mode will be awakened so they can report their current cell location to the network, which affects UE battery life and creates unacceptable network loading for crowded locations.

While the foregoing is directed to various embodiments of the present invention, other and further embodiments of the invention may be devised without departing from the basic scope thereof. As such, the appropriate scope of the invention is to be determined according to the claims.

What is claimed is:

1. A method, comprising:
   receiving, at a network element of a wireless network, an access network mobility management area update signal of a wireless access device of the wireless network, wherein the access network mobility management area update signal is indicative of a user equipment (UE) crossing an area boundary;
   determining, at the network element based on the access network mobility management area update signal, that said UE is located within an area associated with an authorized application or network optimization function that is authorized to receive UE location information for UEs located within said area; and
   providing UE location information of said UE from the network element toward the authorized application or network optimization function that is authorized to receive UE location information for UEs located within said area, using an application programming interface (API) associated with the network element, based on the determination that the UE is located within the area associated with the authorized application or network optimization function that is authorized to receive UE location information for UEs located within said area.

2. The method of claim 1, wherein said area comprises a Routing Area (RA) within a 3G network, and said access network mobility management area update signal comprises a Routing Area Update (RAU) request.

3. The method of claim 1, wherein said area comprises a Tracking Area (TA) within a Long Term Evolution (LTE) network, and said access network mobility management area update signal comprises a Tracking Area Update (TAU) request.

4. The method of claim 1, further comprising forwarding toward said UE a solicitation associated with said authorized application or network optimization function that is authorized to receive UE location information for UEs located within said area.

5. The method of claim 1, wherein said area comprises a venue or a portion of a venue.

6. The method of claim 1, wherein said provided UE location information comprises a UE identifier and an area identifier.

7. The method of claim 6, wherein said provided UE location information further comprises each received area update signal associated with said UE while said UE is located within said area.

8. The method of claim 7, wherein said area is divided into a plurality of sub-areas, where each sub-area is supported by a respective radio link.

9. The method of claim 8, wherein said provided UE location information further includes handoff signals indicative of said UE traversing a boundary of a sub-area.

10. The method of claim 1, wherein said provided UE location information is provided via an open API platform (OAP).

11. The method of claim 10, wherein said OAP is adapted to enable only authorized applications or network optimization functions to receive said provided UE location information.

12. The method of claim 11, wherein said OAP is adapted to provide an API formatting function.

13. The method of claim 11, wherein said OAP is adapted to translate said provided UE location information into a Representational State Transfer (REST) API format.

14. The method of claim 1, wherein said area associated with said authorized application or network optimization function is associated with a venue.

15. The method of claim 14, wherein said authorized application or network optimization function comprises at least one of a use of broadcast service to deliver content and applications within the venue, a video content optimization, a RAN resource allocation, an application based congestion management, a QoS improvement, a discounted access rate, and an application sponsored access.

16. The method of claim 14, wherein a solicitation to initiate a session associated with said authorized application or network optimization function is initiated in response to location information indicative of a subscriber entering an area, and a termination of a session associated with said authorized application or network optimization function is initiated in response to location information indicative of a subscriber exiting an area.

17. A system for managing location-enabled applications, the system comprising:
an access network manager comprising a processor and a memory communicatively connected to the processor, the access network manager configured to:
receive, at the access network manager of a wireless network, an access network mobility management area update signal of a wireless access device of the wireless network, wherein the access network mobility management area update signal is indicative of a user equipment (UE) crossing an area boundary;
determine, at the access network manager based on the access network mobility management area update signal, that the UE is located within an area associated with an authorized application or network optimization function that is authorized to receive UE location information for UEs located within said area; and
provide UE location information of said UE from the access network manager toward the authorized application or network optimization function that is authorized to receive UE location information for UEs located within said area, using an application programming interface (API) associated with the access network manager, based on the determination that the UE is located within the area associated with the authorized application or network optimization function that is authorized to receive UE location information for UEs located within said area.

18. The system of claim 17, further comprising an open API platform (OAP) in communication with said access network manager to propagate said provided UE location information toward equipment supporting said authorized application or network optimization function.

19. A non-transitory computer readable storage medium including software instructions which, when executed by a processor, cause the processor to perform a method, the method comprising:
receiving, at a network element of a wireless network, an access network mobility management area update signal of a wireless access device of the wireless network, wherein the access network mobility management area update signal is indicative of a user equipment (UE) crossing an area boundary;
determining, at the network element based on the access network mobility management area update signal, that said UE is located within an area associated with an authorized application or network optimization function that is authorized to receive UE location information for UEs located within said area; and
providing UE location information of said UE from the network element toward the authorized application or network optimization function that is authorized to receive UE location information for UEs located within said area, using an application programming interface (API) associated with the network element, based on the determination that the UE is located within the area associated with the authorized application or network optimization function that is authorized to receive UE location information for UEs located within said area.

20. A computer program product storing software instructions which, when executed by a computer, cause the computer to perform a method, the method comprising:
receiving, at a network element of a wireless network, an access network mobility management area update signal of a wireless access device of the wireless network, wherein the access network mobility management area update signal is indicative of a user equipment (UE) crossing an area boundary;
determining, at the network element based on the access network mobility management area update signal, that said UE is located within an area associated with an authorized application or network optimization function that is authorized to receive UE location information for UEs located within said area; and
providing UE location information of said UE from the network element toward the authorized application or network optimization function that is authorized to receive UE location information for UEs located within said area, using an application programming interface (API) associated with the network element, based on the determination that the UE is located within the area associated with the authorized application or network optimization function that is authorized to receive UE location information for UEs located within said area.

* * * * *